(Model.)

4 Sheets—Sheet 1.

N. T. REMY
GRAIN BINDER.

No. 256,808. Patented Apr. 18, 1882.

(Model.)

N. T. REMY.
GRAIN BINDER.

No. 256,808. Patented Apr. 18, 1882.

4 Sheets—Sheet 2.

Attest.
Sidney P. Hollingsworth,
Robt. L. Miller

Inventor.
Noah T. Remy
By Tomeinson & Tomeinson
Attys.

(Model.)
N. T. REMY.
GRAIN BINDER.
No. 256,808. Patented Apr. 18, 1882.
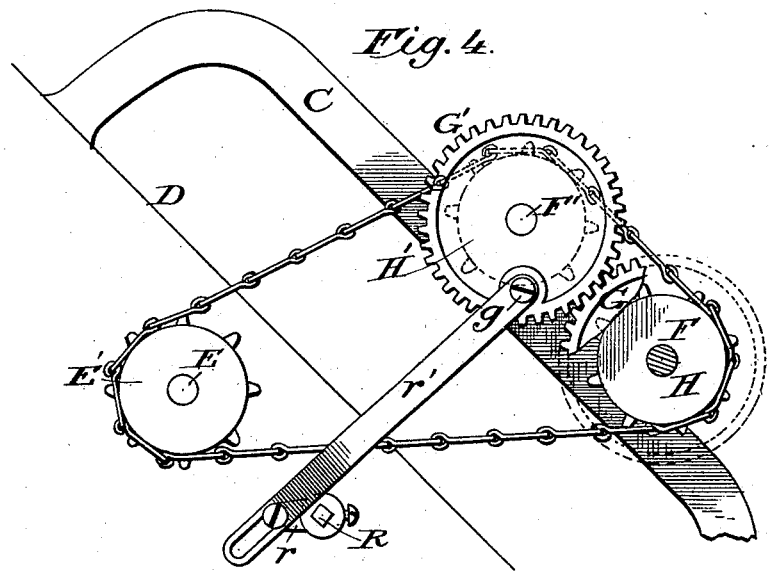
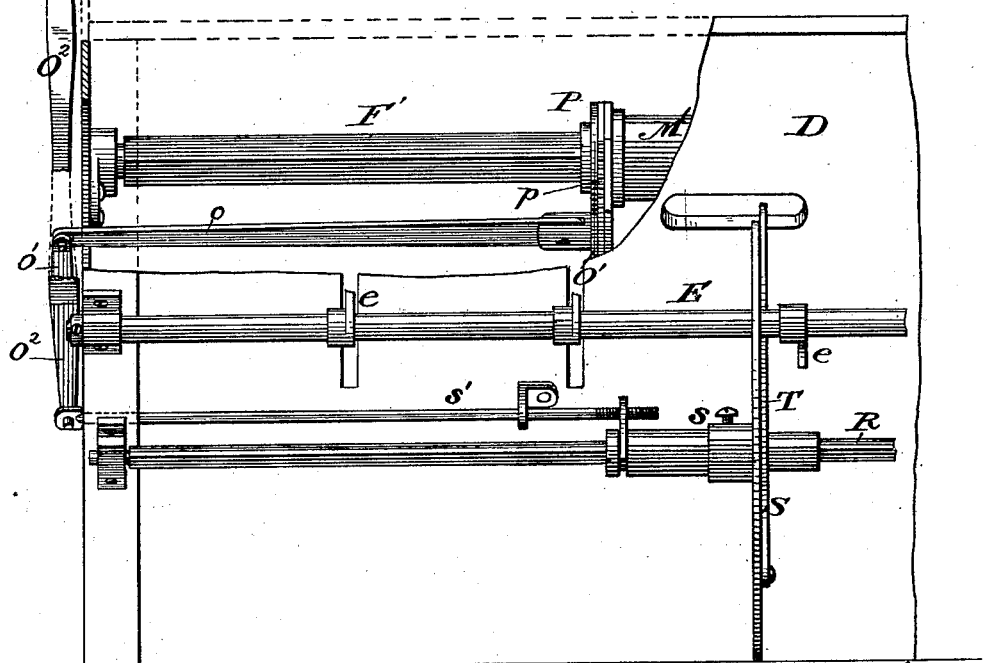

(Model.)

4 Sheets—Sheet 4.

N. T. REMY.
GRAIN BINDER.

No. 256,808. Patented Apr. 18, 1882.

Attest.
Sidney P. Hollingsworth
Robt. L. Miller

Inventor.
Noah T. Remy
By Parkinson & Parkinson
Attys.

UNITED STATES PATENT OFFICE.

NOAH T. REMY, OF MIAMISBURG, OHIO, ASSIGNOR TO ABEL HOOVER AND WILLIAM GAMBLE, OF SAME PLACE.

GRAIN-BINDER.

SPECIFICATION forming part of Letters Patent No. 256,808, dated April 18, 1882.

Application filed October 22, 1881. (Model.)

*To all whom it may concern:*

Be it known that I, NOAH T. REMY, of Miamisburg, county of Montgomery, and State of Ohio, have invented certain new and useful Improvements in Grain-Binders, of which the following is a specification.

One of the most successful types of binders now in the field is that wherein the apparatus for applying and securing the band about the gavel is ordinarily thrown into gear by the regular and gradual accumulation of grain urged forward by packing or feeding mechanism against a suitable tripping device, whereby the binding operation is caused to take place with great certainty whenever the gavel reaches a given or predetermined size.

My invention relates in part to improvements in grain-binding mechanism of this type; in part, also, to improvements on the means for adjusting the binding mechanism longitudinally of the gavel to place the band about its center.

It further relates to an improved arrangement of the cut-off or separator-arm whereby it is actuated by the binding-arm in its movement, and to various other combinations and details of construction, hereinafter described.

Figure 1:
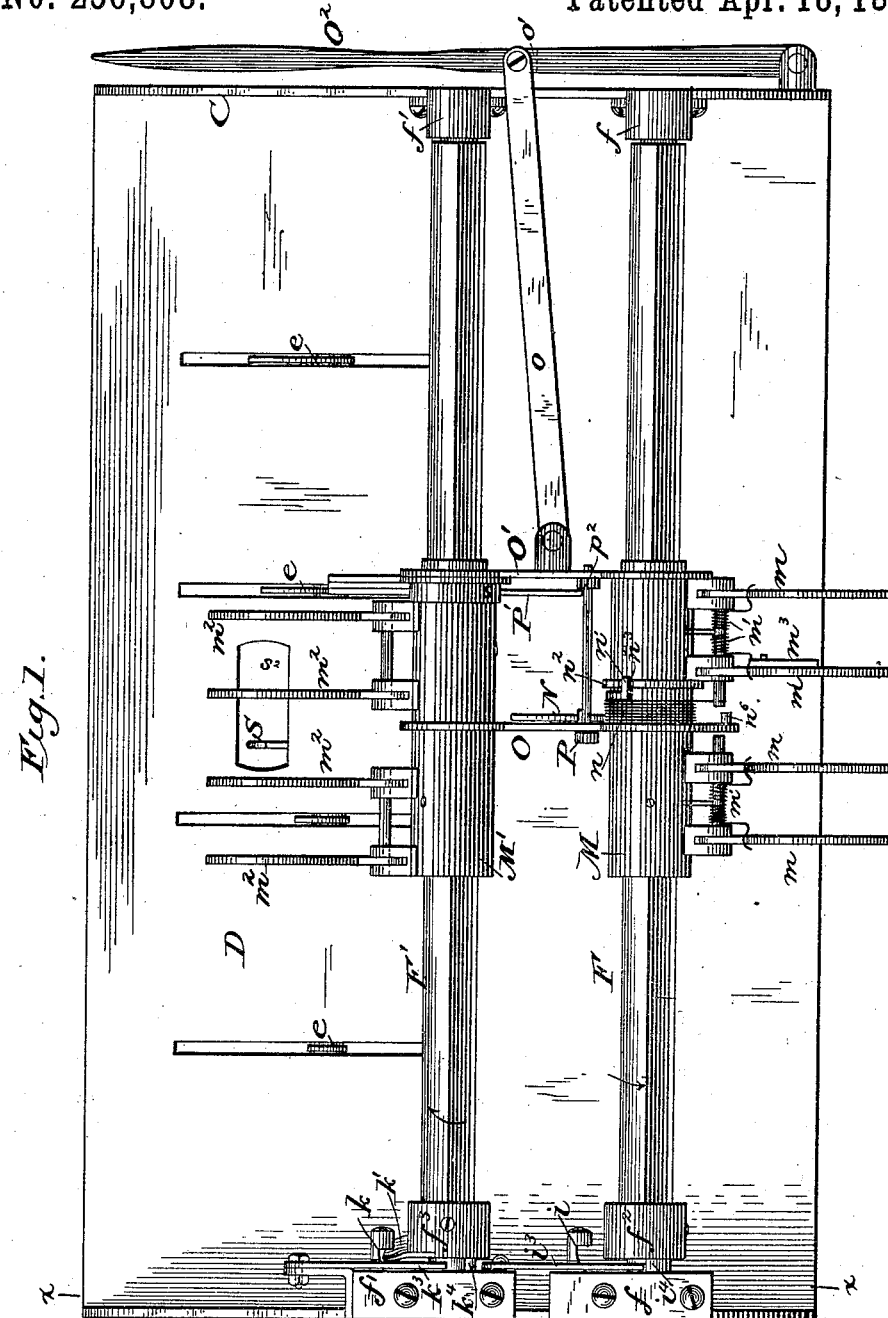
Figure 2:
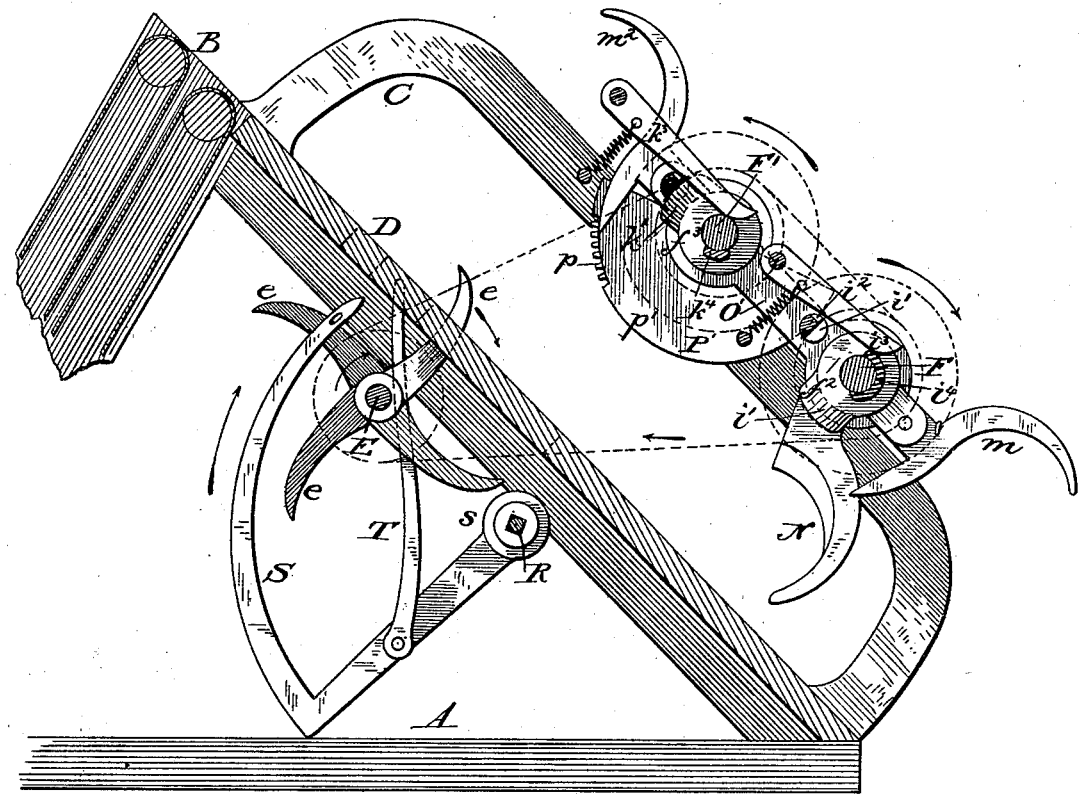
Figure 3:
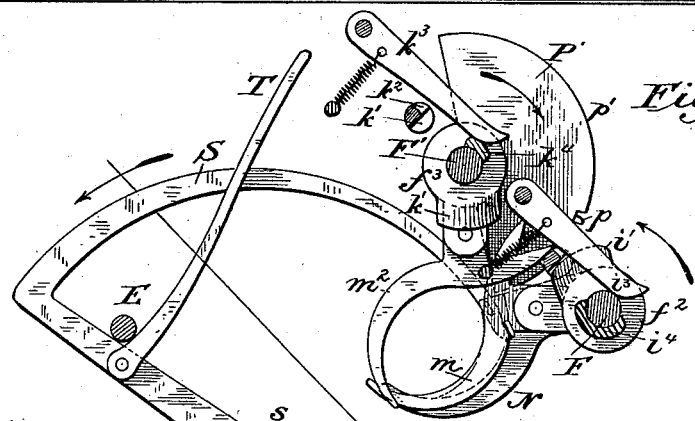
Figure 6:
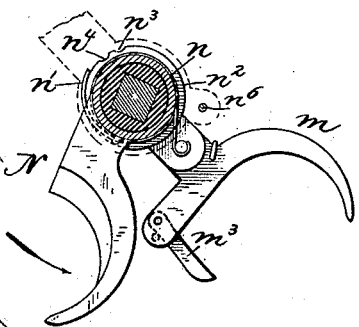
Figure 7:
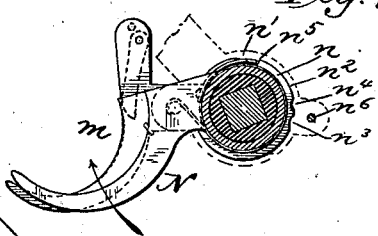
Figure 9:
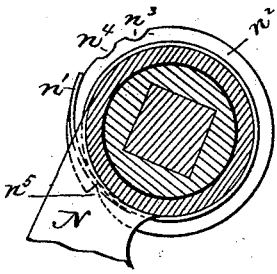
Figure 8:
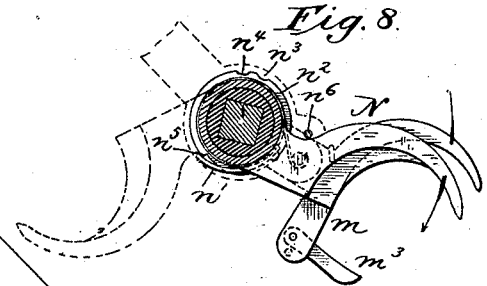

In the drawings, Figure 1 is a view of a machine embodying my invention, taken at right angles to the surface of the decking. Fig. 2 is a transverse vertical section on the line *x x* in Fig. 1, the binding devices being open in position to receive the grain; Fig. 3, a like section on the same line, with the parts advancing to their position for compressing and binding the grain; Fig. 4, an end elevation to show the driving-gearing; Fig. 5, a view from the under side of the binding attachment, with a portion of the decking broken away to properly exhibit the mechanism for longitudinal adjustment; Figs. 6, 7, and 8, details showing the positions assumed by the trip and outside compressor during the operation of the machine; Fig. 9, an enlarged detail to illustrate the mode of mounting and controlling the trip.

This binding attachment may be applied to harvesters having either a low level or an elevated delivery for the grain—that is, either to those where the grain is carried along a substantially-horizontal plane from the cutters to the binder, or to those wherein it is first carried along the platform and then up over elevating belts or rakes to the head of the grain-chute leading to the binding apparatus.

For the purpose of my invention it is sufficient to illustrate it in connection with the latter type, its application to the former following obviously from its relations in the latter.

A represents the main sill of the harvester-frame; B, the elevator, and C the binder-frame. The latter may be made movable, with the mechanism which it supports, along the end of the harvester, as is customary in grain-binding harvesters heretofore used; but I prefer to fix it rigidly to the harvester-frame and to adjust the naked binding apparatus by means hereinafter described, whenever it becomes necessary to compensate in that manner for a change in the length of the grain. As the grain is delivered from the head of the elevator it falls upon an inclined chute, grain-board, or decking, D, and descends thereon by its gravity. Beneath the decking is the constantly-rotating shaft E, upon which are set curved arms *e*, one or more in number, of malleable or gray iron or other suitable material, with hubs and set-screws whereby they are made fast to the shaft. These arms extend out some six or eight inches, passing up through slots in the decking as they rotate, and are curved backward, running with the convex side toward the grain, and curved more sharply at the outer end, so as to clear themselves from the straw as they withdraw beneath the decking in their continued rotation. The object of this shaft and the arms is to force the grain steadily down into the receiver and pack it by a regular increment against the tripping-arm which closes said receiver.

Supported at a suitable distance above the decking, and immediately over that part of it destined to act as the receiver, are two parallel squared shafts, F F', the ends of which are rounded and journaled in boxings *f f'* in the supporting-brackets. At one end these shafts are geared together by means of equal intermeshing pinions G G', so that they are restricted to turn toward or from each other whenever motion is imparted to them. A loose sprocket-wheel, H, is mounted upon the shaft F, and a like loose sprocket-wheel, H', upon the shaft F', both sprocket-wheels having clutch-faces which receive corresponding sliding spring-pressed clutch-halves, h h', feathered to their respective shafts. The clutch-half h is yoked to a sliding-bolt, I, hereinafter for convenience termed a "dowel-rod," passing through a guide-way in the adjacent bracket and notched at its end, as at i, to receive a wing-cam, i', projecting from a collar, f², on the shaft F, so that when the shaft is driven in the direction indicated by the arrow, Fig. 1, the dowel-rod will be drawn back by the cam and move the sliding clutch-half out of engagement. Another notch, i², is formed in the dowel-rod in such relation to the first that when the rod has been drawn back to its full extent it may receive a spring-pressed latch, i³, pivoted to the bracket, whereby the rod will be locked in its retracted position against the stress of the clutch-spring. The end of the latch is beveled or curved, and a tappet or wiper, i⁴, is placed upon the collar f² in such position that whenever the latter is started or rocked in the direction opposed to the arrow in Fig. 1 the tappet will immediately strike and lift the latch and allow the clutch-half to spring into engagement. In like manner the clutch-half h' is yoked to a dowel-rod, K, guided in the adjacent bracket, notched at k to receive a wing-cam, k', projecting from the collar f³ on the shaft F', and at k² to receive a spring-pressed latch, k³, which locks it in position after it has been fully retracted by the rotation of the shaft in the direction opposed to the arrow, Fig. 1, and which is released from the notch by means of the wiper k⁴ on said collar f³ whenever the shaft is driven reversely, but at the end of said reverse motion instead of at the immediate beginning.

The wing-cams are so arranged on their respective shafts that both cannot retract their dowel-rods at the same time. Consequently one clutch-half or the other is always at liberty, except for its latch, to spring into engagement with its sprocket-wheel. The relative position of the tappets, however, is such as to permit both latches to be concurrently in their notches in the dowel-rods when the shafts are in a certain position, as will hereinafter appear. Therefore the sprocket-wheels may both run loosely without actuating either shaft.

Upon the packer-shaft E, which is intended to be continuously driven, is a fast sprocket-wheel, E', and from this a chain-belt passes over the sprocket-wheels H H', driving them constantly in the same direction. Now, supposing the shafts to be in their position of rest, if the shaft F is rocked in such direction as to bring its tappet against the latch i³, as indicated in Fig. 2, it will immediately be clutched to the sprocket-wheel H and be driven thereby, driving also, through the gears G G', the opposite shaft, F', until the wing-cam i' on the shaft F enters and fully retracts the dowel-rod I, opening the clutch. At this moment, however, the tappet upon the shaft F' has lifted the latch k³, and the sprocket-wheel H' has become clutched to said shaft, which thus in its turn becomes the driver of the other, the motion of both shafts thereby being reversed until the wing-cam k' has retracted dowel-rod I' and unclutched the sprocket-wheel H', when both shafts will have resumed the position they had at the start, with both dowel-rods latched and both sprocket-wheels again running idle.

Upon the squared portions of the shafts F and F' are placed cast hubs M M', free to move back and forth. To the hub M on the shaft F—the lower shaft, where the binder-decking is inclined, as in the present example—are pivoted one or more compressor-arms, m, seated against springs m', so that they may yield resistingly and allow the necessary latitude in the size of the bundle or gavel to be bound. An opposing compressor arm or arms, m², is rigidly secured to the upper hub, M', and the arrangement of the arms on each hub is such that when the shafts are at rest and the sprocket-wheels both unclutched they are open or lifted away from the decking.

To the lower hub is also sleeved a tripping-arm, N, which normally depends across the space between the shaft and binder-decking, so as to close the exit side of the receptacle and stop the passage of the straw, which is gradually fed against it by the packer. A spring, n, is coiled about the sleeve of this tripping-arm, being connected at one end to said sleeve and at the other to the hub in such manner as to tend to urge the arm constantly forward against the grain. A spring latch or brake, n', is also secured to the sleeve and bent at its free end, so as to rest upon a notched rim, n², of the hub. When the arm is down in position to stop the grain the end of the brake rests in the notch n³ and holds it with such force against the pressure of the accumulating gavel as to cause the hub and shaft to give or rock backward with the arm, thus raising, through the tappet on the shaft, the latch i³ at the moment a sufficient gavel has been packed into the receptacle. Should, however, the brake escape from its notch before the latch has been raised, a second notch, n⁴, is provided which will make the operation certain. The raising of the latch brings the sprocket-wheel H into action, as hereinbefore described, causing both shafts to move and carry the compressor-arms from the position indicated in Fig. 2 to that in Fig. 3, thereby compressing the gavel. In this movement the coiled spring n allows the tripping-arm to relatively yield until it is alongside or in line with the outer compressor arm or arms, when the brake n', which has ridden over the rim to this point, latches behind a shoulder, n⁵, and locks the arm against the stress of the spring, so that when the compressors open in the ensuing reverse movement of the shaft it will accompany the outer one and open the passage-way for the exit of the bound sheaf. As the compressors approach the limit of their upward movement the tripping-arm strikes a stop, $n^6$, with sufficient force to disengage the brake from the shoulder, whereupon it is returned to position to receive the succeeding gavel by the force of the coiled spring.

At or near the center of the hubs on the squared shafts is placed a yoke or connection, O, which prevents the shafts from springing apart when the compressor-arms are squeezing the gavel. At or near the end of said hubs is another similar yoke, O', which serves the same purpose as the first mentioned, and serves also as a means for the attachment of a link, $o$, which is connected with one lateral arm, $o'$, of a cross-shaped lever, $O^2$, whereby the hubs and attached trip and compressor-arms may be adjusted along the shafts to compensate for varying lengths of grain.

The knotter or twister, whichever it may be, will be attached to the central yoke, and in order to drive it a short shaft, P, is journaled in the two yokes, as shown. To the upper hub is attached a segment, P', having a series of gear-teeth, $p$, and a delay-surface, $p'$, suitably arranged and engaging with a pinion, $p^2$, and delay-shoe on the short shaft, so that this shaft will be locked fast while the compressor-arms are descending and until they are nearing the end of their downward movement and are compressing the gavel, and then released and rotated by the gear-teeth to actuate the band-securing device.

To increase the size of the gavel the set-screw that holds the collar $f^2$, carrying the cam and tappet on the lower shaft, is loosened and said collar rolled back on the shaft the proper distance and tightened up. This will allow the tripping-arm to be thrown farther back by the accumulating grain before it rocks the shaft sufficiently to bring the tappet against the latch and cause the clutch to engage. At the same time it will bring the wing-cam nearer to the dowel-rod, insuring the disengagement of the clutch before the compressor-arms have been brought so close together, as in binding the smaller gavel, and thereby obviating risk of breakage. To diminish the size of the gavel the collar is of course adjusted in the contrary direction.

A brake or equivalent device may be used upon one of the compressor shafts to prevent the arms from sagging while the sprocket-wheels are running loose, and also to determine the amount of resistance the trip shall offer to the incoming grain before it yields sufficiently to start the binding apparatus.

Behind the decking, below the packer-shaft and running parallel with the compressor-shafts, is the needle or binder-arm shaft R, supported in suitable bearings. Upon its outer end it has a crank, $r$, which is connected by means of a slotted pitman, $r'$, with a wrist-pin, $g$, upon the gear-wheel G', whereby it receives motion at the proper time, the slot allowing a period of rest while the wheel is in motion, so that the binding-arm may tarry beneath the decking until the compressor-arms have entered the straw.

The needle or binding-arm S is secured to this shaft by means of a hub, $s$, which is either feathered to said shaft or fitted to a squared portion thereof, so as to partake of its movements and at the same time be free to slide to and fro thereon. A link, $s'$, leads from the hub to the lower lateral arm, $o^2$, of the lever $O^2$, so that it may be adjusted co-ordinately and concurrently with the compressor-hubs. The decking has an oblong lengthwise slot, $s^2$, through which the binding-arm rises, and which is of sufficient length to allow the necessary range of adjustment.

Pivoted to the curved binder-arm at a point along the length thereof is a separator-arm, T, which reaches up to and is guided by the slot in the decking in such manner that when the binding-arm rises it will also rise and gradually separate away therefrom and move up against the incoming grain to cut it off from the binding-arm and gavel.

The arrangement of the binding-arm and upper or inner compressor is such that as the compressor-arms of the latter descend they divide the grain in line with the point of said binding-arm, which thereupon rises with the separator-arm through the cleft so made and for an instant passes alongside the adjacent compressor-arm, thus making a clean division of the gavel from the rest of the mass. The binding-arm then continues its course to carry the band to the uniting mechanism, while the separator-arm stops, and in a measure presses back the stream above, which the packer is constantly urging forward.

Upon the heel of one of the outer or lower compressor-arms is a pivoted dog, $m^3$, stopped in one direction by a pin or lug on said arm. During the compressing operation this dog embeds itself in the gavel, and when the latter is bound and the compressor-arms rise it is borne outward by its stop and ejects the finished sheaf from the machine.

The details of my invention may be modified in various ways—as, for instance, the packer may cease its movement during the binding of a gavel, a separator-arm otherwise actuated may be used in combination with the remaining elements of the machine, the gearing may to some extent be differently arranged, as will be obvious to a skilled mechanic, and the variation in size of the gavels may be obtained by adjustment of the tripping-arm instead of the collar carrying the wing-cam.

I claim—

1. The compressor arm or arms and band-securing mechanism secured to a laterally-sliding frame above the stationary decking or grain-receptacle, combined with a binder-arm sliding laterally upon a shaft beneath said decking, and a common adjusting-lever.

2. The combination of compressor-arms mounted upon shafts above the decking or grain-receptacle and opposing each other, band-securing mechanism mounted proximately to the pivots of said compressor-arms, and a binding-arm mounted upon a shaft beneath the decking.

3. The combination of compressor-arms mounted upon shafts above the decking or grain-receptacle and opposing each other, band-securing mechanism mounted proximately to the pivots of said compressor-arms, a binding-arm mounted upon a shaft beneath the decking, and driving-gear whereby the binding-arm is caused to meet one of the compressor-arms as it rises to make a clean division of the gavel from the incoming stream.

4. The combination of the opposing compressor-arms attached to hubs which slide longitudinally upon their shafts, the yokes connecting said hubs to prevent the shafts from springing, the band-securing devices mounted in said yokes, the binder-arm, also attached to a hub which slides upon its shaft, the stationary decking between the compressor and binder arms, and a common lever or equivalent device connected with the hubs to co-ordinately adjust the compressing and binding mechanism.

5. The combination, in a grain-binder, of a tripping-arm normally in position to receive the pressure of the incoming grain, and arranged to slide laterally upon its shaft, a binder-arm, also arranged to slide laterally upon its shaft, and a common adjusting-lever whereby they may be moved co-ordinately.

6. The combination, in a grain-binder, of an outside compressor-arm arranged to slide laterally upon its shaft, a tripping-arm normally in advance of said compressor-arm and sliding therewith, a binder-arm, also sliding laterally on its shaft, and a common lever whereby said devices may be simultaneously adjusted.

7. The combination, in a grain-binder, of opposing compressors arranged upon a laterally-sliding frame carried by their actuating-shafts, a trip mounted upon said frame and normally in advance of the outside compressor, a binder-arm, also arranged to slide laterally upon its shaft and parallel with the movement of the compressor frame or carriage, and a common lever for co-ordinate adjustment of said devices.

8. In a grain-binder, the combination of the grain-receptacle, a packer, an outside compressor arm or arms normally open, and a tripping-arm normally in advance of the compressor-arm and closing the exit from the receptacle, against which tripping-arm the grain is forced by the packer.

9. In a grain-binder, the combination of the grain-receptacle, a packer, outside and inside compressor-arms normally open, and a tripping-arm normally in advance of the outside compressor and closing the exit from the receptacle in such manner as to receive the grain forced forward by the packer.

10. In a grain-binder, the combination of the grain-receptacle, a packer, an outside compressor arm or arms normally open, a tripping-arm normally in advance of the compressor-arm and closing the exit from the receptacle to receive the grain from the packer, and a binding-arm actuated in common with said compressor-arm by mechanism thrown into gear by the trip.

11. In a grain-binder, the combination of the grain-receptacle, a packer, outside and inside compressor-arms normally open, a tripping-arm normally in advance of the outside compressor and closing the exit from the receptacle, and a binding-arm actuated in common with said compressor-arms by mechanism thrown into gear by the trip.

12. The combination of the outside compressor-arm, the tripping-arm normally in advance thereof to close the grain-receptacle, means whereby the tripping-arm is locked to the compressor-arm as the latter descends and comes alongside, and means releasing it therefrom as said compressor-arm nears the end of its return movement.

13. The combination of the outer compressor-shaft, the tripping-arm carried thereby, the sprocket-wheel running loose on said shaft, the sliding clutch, its yoke and notched dowel-rod, the latch upon the frame, and the tappet upon the shaft, whereby the trip causes the clutch to engage by rocking the shaft in its bearings.

14. The combination of the outer compressor-shaft, the tripping-arm carried thereby, the sprocket-wheel running loose on said shaft, the sliding clutch, its yoke and notched dowel-rod, the latch upon the frame, and the tappet and wing-cam upon the shaft, whereby the trip causes the disengagement of the latch and engagement of the clutch by rocking the shaft in its bearings, and the wing-cam restores the dowel-rod to position and reopens the clutch in the ensuing positive movement.

15. The combination of the two shafts carrying the opposing compressor-arms, the sprocket-wheels running loose thereon, the chain driving said sprocket-wheels constantly in one direction, the intermeshing fixed gear-wheels, and means whereby the shafts are turn by turn clutched to and released from their sprocket-wheels.

16. The combination of the two shafts carrying the opposing compressor-arms, the sprocket-wheels running loose thereon, the chain driving said sprocket-wheels constantly in one direction, the intermeshing fixed gear-wheels, the binder-arm and its cranked shaft, the pitman connecting the binder-arm shaft with a wrist-pin on one of the gear-wheels, and means whereby the compressor-shafts are turn by turn clutched to and released from their sprocket-wheels.

17. The combination, to form a tripping mechanism for grain-binders, of a rock-shaft, a tripping-arm mounted upon said rock-shaft and opposing the incoming grain, a constantly-driven gear or sprocket wheel normally loose upon the shaft, a spring-pressed sliding clutch held out of engagement with said wheel by means of a latch, a tappet upon the shaft in position to be brought against and release the latch as the tripping arm yields and rolls the shaft, and means for restoring the clutch to its open position after the shaft has been driven the proper distance.

18. The combination, substantially as described, of a gear or sprocket wheel, a spring-pressed sliding clutch engaging therewith, a yoke and notched dowel-rod connected with the sliding clutch, a pivoted latch upon the frame to lock said dowel-rod, a tappet carried by the shaft to release the latch and permit the clutch to engage, and a wing-cam, also carried by the shaft to again retract the dowel-rod and clutch.

19. The combination of the opposing compressing-arms and their respective rock-shafts, the tripping-arm on the outer shaft, the sprocket-wheels running loose on said shafts, the intermeshing gear-wheels fixed to the shafts, the sliding clutches and their yokes and notched dowel-rods, the latches upon the frame, and the tappets and wing-cams carried by the shafts, all relatively arranged as set forth.

20. In combination with the outer compressor-shaft, the adjustable collar carrying the tappet and wing-cam, substantially as and for the purpose described.

21. The combination, with the shaft supported in the yokes which bind the compressor-hubs together and driving the band-uniting mechanism, of the segment upon one of the compressor-shafts for actuating said driving-shaft, as set forth.

22. The combination, with the binding-arm, of the separator-arm pivoted thereto and guided as to the path in which it moves by the slot in the decking through which the binding-arm passes.

23. The tripping-arm mounted upon the shaft F, combined with the coiled spring, the brake, and the notched rim, substantially as and for the purpose set forth.

24. The combination of the tripping-arm, its coiled spring and brake, the rim $n^2$ and its shoulder $n^5$, the compressor-arm, and the stop $n^6$ on the frame, as and for the purpose described.

25. The combination, with the outside vibrating compressing-arm, of the pivoted dog and its stop to form a gavel-ejector, as set forth.

NOAH T. REMY.

Witnesses:
G. A. GROVE,
LEWIS H. ZEHRING.